United States Patent
Lee et al.

(10) Patent No.: US 7,293,293 B2
(45) Date of Patent: Nov. 6, 2007

(54) APPARATUS AND METHOD FOR DETECTING ILLEGITIMATE CHANGE OF WEB RESOURCES

(75) Inventors: Jae Seung Lee, Seoul (KR); Ki Young Moon, Taejon (KR); Chee Hang Park, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 872 days.

(21) Appl. No.: 10/274,996

(22) Filed: Oct. 22, 2002

(65) Prior Publication Data

US 2003/0145197 A1 Jul. 31, 2003

(30) Foreign Application Priority Data

Dec. 28, 2001 (KR) .............................. 2001-86482

(51) Int. Cl.
    G06F 7/02 (2006.01)
    H04L 9/00 (2006.01)
(52) U.S. Cl. .................... 726/30; 713/168; 713/155; 713/176
(58) Field of Classification Search ................ 713/168, 713/155, 176; 726/30
    See application file for complete search history.

(56) References Cited

U.S. PATENT DOCUMENTS

| | | | |
|---|---|---|---|
| 5,949,877 A | | 9/1999 | Traw et al. |
| 5,978,842 A * | | 11/1999 | Noble et al. ................. 709/218 |
| 6,098,056 A | | 8/2000 | Rusnak et al. |
| 6,351,811 B1 * | | 2/2002 | Groshon et al. ............. 713/176 |
| 6,389,541 B1 | | 5/2002 | Patterson |
| 6,598,161 B1 * | | 7/2003 | Kluttz et al. ................. 713/166 |
| 6,704,871 B1 * | | 3/2004 | Kaplan et al. ............... 713/192 |
| 6,915,482 B2 * | | 7/2005 | Jellum et al. ................ 715/511 |
| 2002/0091925 A1 * | | 7/2002 | Suzuki et al. ............... 713/168 |
| 2002/0124172 A1 * | | 9/2002 | Manahan ..................... 713/176 |
| 2004/0230820 A1 * | | 11/2004 | Hui Hsu et al. ............. 713/200 |

OTHER PUBLICATIONS

Menezes, Alfred et al, Handbook of Applied Cryptography, 1997, pp. 362-363.*

* cited by examiner

*Primary Examiner*—Emmanuel L. Moise
*Assistant Examiner*—Michael Pyzocha
(74) *Attorney, Agent, or Firm*—Lowe Hauptman Ham & Berner LLP

(57) ABSTRACT

The invention relates to an apparatus and method for detecting an illegitimate change of web resources, which is capable of detecting whether or not HTML, XHTML and XML documents, general text documents, binary data of graphic files linked to HTML document and the like are illegitimately changed using XML digital signature and XML encryption when inquiring corresponding web page. It is characteristic of the present invention to confirm in real time whether or not the web page is illegitimately changed by inserting an illegitimate change detecting information into the web page by a web server administrator and executing corresponding web page through a web browser by a user.

9 Claims, 4 Drawing Sheets

APPARATUS AND METHOD FOR DETECTING ILLEGITIMATE CHANGE OF WEB RESOURCES

BACKGROUND OF THE INVENTION

1. Field of the Invention

The present invention relates to a digital contents protecting apparatus applying a digital signature technique, and more particularly, to an apparatus and method for detecting an illegitimate change of web resources, which is capable of generating an extensible markup language (hereinafter, referred to as XML) digital signature of the web resources, detecting an illegitimate change of the web page through a verification of the XML digital signature, and providing confidentiality to a specific resource using an XML encryption.

2. Description of the Related Art

Recently, the use of webs has been increased explosively. As its reverse function, however, web pages are illegitimately changed, so that the cases of providing wrong information to people are increased. For example, the web pages such as an electronic commerce shopping mall site and a stock information providing site are illegitimately changed, so that the occasions of manipulating the goods price or the stock price are increased. Although these illegitimate changes of the web pages result in heavy damage to the corresponding sites and the users, there is no apparatus for detecting in real time whether or not the corresponding web page is illegitimately changed when the user surfs the web.

One method of confirming the change of the web page is to obtain a message digest of files constituting the web page at a web server side, generate a checksum file, and then to check periodically whether or not its value is correct. However, this method has a limitation that only a web server administrator can check whether or not the web page is changed.

Meanwhile, another method is to generate the digital signatures of each of web pages and insert them into the web pages. However, if a conventional digital signature technique is applied to HTML or XML document without any modification, a result of the digital signature is stored as a binary object. Therefore, it is not combined well with the text-based HTML or XML document, and an algorithm identifier is made up of an object identifier difficult for people to acknowledge. Further, when the signature is verified, information process for algorithms and a certificate should be operated subordinately to a specific application.

SUMMARY OF THE INVENTION

Accordingly the present invention has been devised to solve the foregoing problems of the prior art, and it is an object of the invention to provide an apparatus and method for detecting an illegitimate change of web resources, in which an XML-type web page illegitimate change detecting information is inserted into a web page and the illegitimate change detecting information is verified in real time when the corresponding web page is inquired, thereby detecting the illegitimate change of the web page.

To accomplish the above object, there is provided an apparatus for detecting illegitimate change of web resources comprising: a web resource protection processing sub-system for generating and inserting illegitimate change detecting information into corresponding web resource, wherein the illegitimate change detecting information is used to detect whether or not the web resource is changed illegitimately; and a web resource change detecting sub-system for judging whether or not the corresponding web resource is illegitimately changed, based on the illegitimate change detecting information contained in the web resource, when the web resource is executed by a communication network.

At this time, preferably, the web resource protection processing sub-system includes: a user interface unit for selecting a target into which the illegitimate change detecting information are to be inserted through an interface with a web resource protection processing sub-system administrator; an encryption library unit having various encryption algorithms stored therein, for providing corresponding encryption algorithm in response to an external request; a ciphertext generating unit for generating an XML-type ciphertext of a predetermined resource, based on a predetermined encryption algorithm stored in the encryption library unit; a digital signature generating unit for generating XML digital signatures of a predetermined document and a predetermined related web resource, based on a predetermined encryption algorithm stored in the encryption library unit; a web resource analyzing/processing unit for examining documents and resources into which the illegitimate change detecting information is to be inserted and resources to which an encryption process is to be performed, through a data exchange with the user interface unit; for providing information about the documents and the resources, into which the illegitimate change detecting information is to be inserted, to the digital signature generating unit; for providing information on the resources to which the encryption is to be processed to the ciphertext generating unit; and for receiving the processing results from the digital signature generating unit and the ciphertext generating unit and inserting the illegitimate change detecting information into the corresponding documents and resources, the illegitimate change detecting information being constituted with an XML digital signature; and an illegitimate change detection file generating unit for detecting a damage of the illegitimate change detecting information and that of information on the link to the illegitimate change detecting information of the corresponding document.

Also, preferably, the web resource change detecting sub-system includes: an illegitimate change information detecting unit for examining whether or not there is actually an illegitimate change detecting information and calling other processing unit to thereby operate a function of detecting an illegitimate change, if a user accesses a predetermined document via a communication network and then a link to a web resource illegitimate change detecting information of the accessed document is executed; an encryption library unit having various encryption algorithms stored therein, for providing corresponding encryption algorithm in response to an external request; a digital signature verifying unit for performing a verification of the document and linked related resources based on a predetermined encryption algorithm stored in the encryption library unit, if an illegitimate change detecting information of the corresponding document is detected by the illegitimate change information detecting unit; a decryption unit for decrypting the encrypted resources in XML-type based on a predetermined encryption algorithm stored in the encryption library unit, if there are encrypted resources; and an illegitimate change information processing unit for calling the digital signature verifying unit, examining the truth of corresponding document using a processing result of the digital signature verifying unit, and providing the examination result to the user, for calling the decryption unit, performing decryption if there are encrypted resources, and providing the decryption result to the user.

Meanwhile, to accomplish the above object, there is provided a method for detecting an illegitimate change of web resources, the method comprising the steps of a) generating an illegitimate change detecting information for detecting whether or not the web resources are illegitimately changed and inserting the illegitimate change detecting information into corresponding web resource; and b) when the corresponding web resource is executed by a communication network, judging whether or not the web resource is illegitimately changed, based on the illegitimate change detecting information contained in the corresponding web resource.

At this time, preferably, the step a) includes the steps of: a1) receiving web page selection information in which the illegitimate change detecting information is to be inserted and related option information from a user; a2) analyzing an external resource linked to the selected web page, and, among the external resources, selecting resources to perform an illegitimate change detecting process and an encryption process; a3) generating an XML ciphertext of the resource selected for the encryption process at the step a2), and updating URI information of the web page that refers to the resource; a4) generating reference elements of each of the selected resources, and generating and storing an XML digital signature containing the reference elements; a5) generating a link to the XML digital signature document in the web page selected at the step a1), to make the XML digital signature is accessed when the link is selected to perform a verification of the corresponding document by the user; and a6) generating a checksum file of a directory of web server so as to detect a damage of the illegitimate change detecting information and that of the information on the link to the illegitimate change detecting information of the corresponding web page, the web server that contains the illegitimate change detecting information and the linked resources.

Further, preferably, the step b) includes the steps of: b1) if the user accesses the web page via a communication network and then selects a link to the illegitimate change detecting information contained in the web page, checking whether or not there is the illegitimate change detecting information constituted with the XML digital signature at the corresponding web page; b2) if there is the illegitimate change detecting information as a result of the step b1), analyzing the illegitimate change detecting information and verifying whether or not the XML digital signature is valid; and b3) providing the verification result of the step b2) to the user.

Furthermore, to additionally provide a confidentiality, the step b) further includes the steps of b4) if the XML digital signature is valid as the analysis result of the step b2), examining whether or not there is an XML ciphertext among the verified resources, and, if there is the XML ciphertext, checking whether or not the user has a decryption key for decrypting the corresponding ciphertext; b5) if the user has the decryption key as a checking result of the step b4), decrypting the corresponding XML ciphertext using the key; b6) if the process of decrypting the corresponding XML ciphertext succeeds, storing the decrypted document, and updating URI information of the prior-to-decryption XML ciphertext with that of the decrypted document; and b7) displaying to the user a message representing the success in the decryption.

BRIEF DESCRIPTION OF THE DRAWINGS

The above object, other features and advantages of the present invention will become more apparent by describing the preferred embodiment thereof with reference to the accompanying drawings, in which.

DETAILED DESCRIPTION OF THE PREFERRED EMBODIMENT

Hereinafter, preferred embodiments relating with an apparatus and a method for detecting an illegitimate change of web resources in accordance with the present invention are described in detail with reference to the accompanying drawings. The above-described characteristics and other advantages of the present invention will be more apparent through the following description, and the detailed description of the prior art, which may unnecessarily obscure the scope and spirit of the invention, will be omitted.

To begin with, the present invention utilizes XML digital signature and XML encryption to judge an illegitimate change of web resources and to encrypt a specific resource. A detailed description of the XML digital signature and the XML encryption will be omitted, since they are well-known techniques. The apparatus for detecting the illegitimate change of the web resources will be first described briefly, and then its system structure and functions of each module contained in the apparatus will be described. Thereafter, a flow chart showing a method of detecting the illegitimate change of the web resources will be described in detail.

Figure 1:
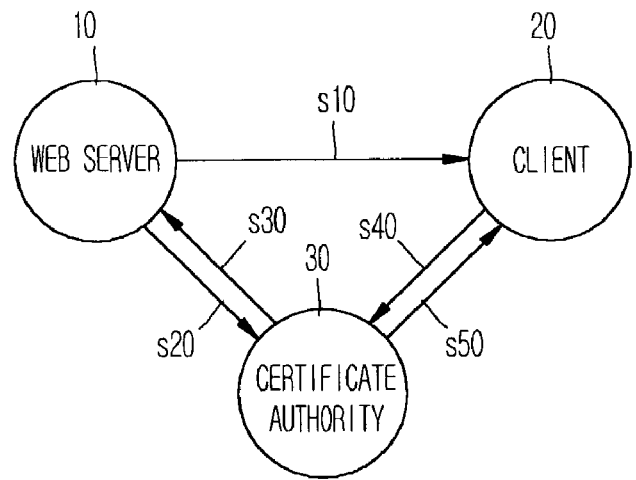
FIG. 1 is a system structure of an apparatus for detecting an illegitimate change of web resources in accordance with the present invention.

FIG. 1 is a system structure of the apparatus for detecting the illegitimate change of the web resources and gives an epitome of the apparatus in accordance with the present invention. Referring to FIG. 1, the apparatus of the present invention includes a web server 10 and a client 20. The web server 10 generates an illegitimate change detecting information and inserts that information into a web page intended to be inserted. The client 20 accesses the web server 10 to execute a desired web page (S10) and runs the illegitimate change detecting information linked to the web page, thereby judging the illegitimate change of the corresponding web page. Meanwhile, to perform the method for detecting the illegitimate change in accordance with the present invention, the web server 10 and the client 20 request a certificate to a separate certificate authority 30 (S20, S40), and the certificate authority 30 issues corresponding certificate to the web server 10 and the client 20 and performs an inquiry or a searching operation (S30, S50).

At this time, a web resource protection processing sub-system installed in the web server 10 examines a to-be-protected web page, related resources, and resources to be additionally encrypted, based on user optional information.

The web resource protection processing sub-system generates an XML ciphertext of the resources selected to be encrypted and then performs an XML digital signature of resources selected to be protected that will detect the illegitimate change.

Meanwhile, a web resource protection field detecting plug-in and a web resource change detecting sub-system are installed in the client 20 and analyzes the illegitimate change detecting information of the corresponding web page when the web page is accessed through a web browser. If there is the illegitimate change detecting information of the web resources, the web resource change detecting sub-system is called and detects the illegitimate change of the corresponding resources by verifying the XML digital signature. Further, the web resource change detecting sub-system examines an existence of the additionally encrypted resources. If there are the additionally encrypted resources, the web resource change detecting sub-system decrypts the additionally encrypted resources.

Figure 2:
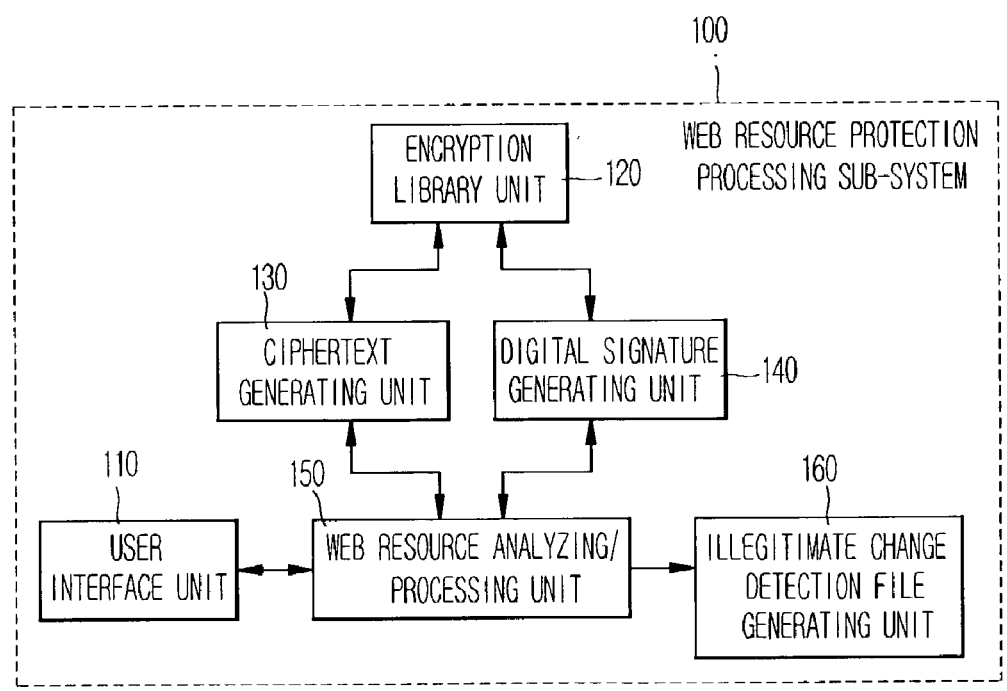
FIG. 2 is a schematic block diagram of a web resource protection processing sub-system in accordance with an embodiment of the present invention.

FIG. 2 is a schematic block diagram of the web resource protection processing sub-system 100 in accordance with an embodiment of the present invention. Referring to FIG. 2, the web resource protection processing sub-system 100 includes a user interface unit 110, an encryption library unit 120, a ciphertext generating unit 130, a digital signature generating unit 140, a web resource analyzing/processing unit 150, and an illegitimate change detection file (checksum file) generating unit 160.

The user interface unit 110 selects a target, into which the illegitimate change detecting information is to be inserted, through an interface with a web resource protection processing sub-system administrator. At this time, web pages and web resources linked thereto can be selected as the target to which the illegitimate change detecting process is to be performed.

In other words, the user interface unit 110 selects a web page (e.g., index.html) into which the illegitimate change detecting information is to be inserted, receives related options, and then calls the web resource analyzing/processing unit 150. Also, the user interface unit 110 examines the information on the web resources linked to the corresponding web page, which is analyzed by the web resource analyzing/processing unit 150, and receives user's selection to which resources the illegitimate change detecting information process is performed and to which resources the additional encryption is applied. Then, the user interface unit 110 transmits corresponding option to the web resource analyzing/processing unit, thereby allowing the web resource illegitimate change detecting process.

The encryption library unit 120 has various encryption algorithms stored therein and provides corresponding algorithms in response to an external request. In other words, the encryption library unit 120 is called when the digital signature generating unit 140 and the ciphertext generating unit 130 performs an encryption algorithm, and has various encryption algorithms stored therein.

The ciphertext generating unit 130 generates an XML-type ciphertext of a predetermined resource, based on a predetermined encryption algorithm stored in the encryption library unit 120. At this time, in case where a to-be-singed target is an XML document, the ciphertext generating unit 130 encrypts an entire document or a portion of the document by the user's selection.

The digital signature generating unit 140 generates an XML digital signature of a predetermined document and a predetermined related web resource, based on a predetermined algorithm stored in the encryption library unit 120. At this time, the digital signature generating unit 140 generates the digital signature of a plurality of various resources in a type of one XML document. The various resources include XML, HTML, XHTML documents, texts, and binary files. In case where the to-be-signed target is the XML document, the digital signature generating unit 140 signs the entire document or a portion of the document by the user's selection.

Through a data exchange with the user interface unit 110, the web resource analyzing/processing unit 150 examines the documents and the resources, to which the illegitimate change detecting process is to be performed, and resources to be encrypted. Then, the web resource analyzing/processing unit 150 provides the information on the document and the resources, to which the illegitimate change detecting process is to be performed, to the digital signature generating unit 140. It also provides the information on the resources to be encrypted to the ciphertext generating unit 130. The web resource analyzing/processing unit 150 then receives the processing result from the digital signature generating unit 140 and the ciphertext generating unit 130, and inserts the illegitimate change detecting information constituted with the XML digital signature into the corresponding document and resources.

In other words, the web resource analyzing/processing unit 150 is called from the user interface unit 110 and analyzes the web page selected by the user. As an analysis result, the web resource analyzing/processing unit 150 displays the resources linked to the corresponding web page to the user. Also, the web resource analyzing/processing unit 150 receives from the user interface unit 110 to which resource the illegitimate change detecting information process is performed and to which resource the encryption is applied, and calls the ciphertext generating unit 130 and the digital signature generating unit 140. Therefore, the web resource analyzing/processing unit 150 performs the encryption of a specific resource and an insertion of the illegitimate change detecting information, and generates the link of the illegitimate change detecting information constituted with the XML digital signature at the selected web page (e.g., index.html). Thereafter, the web resource analyzing/processing unit 150 calls the illegitimate change detecting file (checksum file) generating unit 160 and allow the illegitimate change detecting file (checksum file) generating unit 160 to generate the checksum of corresponding directory of the web server.

Meanwhile, the illegitimate change detecting file (checksum file) generating unit 160 detects a damage of the illegitimate change detecting information and that of the link between the illegitimate change detecting information and the resources. In other words, after performing the illegitimate change detecting process and the encryption process, the illegitimate change detecting file (checksum file) generating unit 160 generate the checksum file of the corresponding directory of the web server so as to detect attacks, such as the damage of the illegitimate change detecting information caused by a hacking of the web server and a removal of the link to the illegitimate change detecting information of the web page (e.g., index.html).

Figure 3:
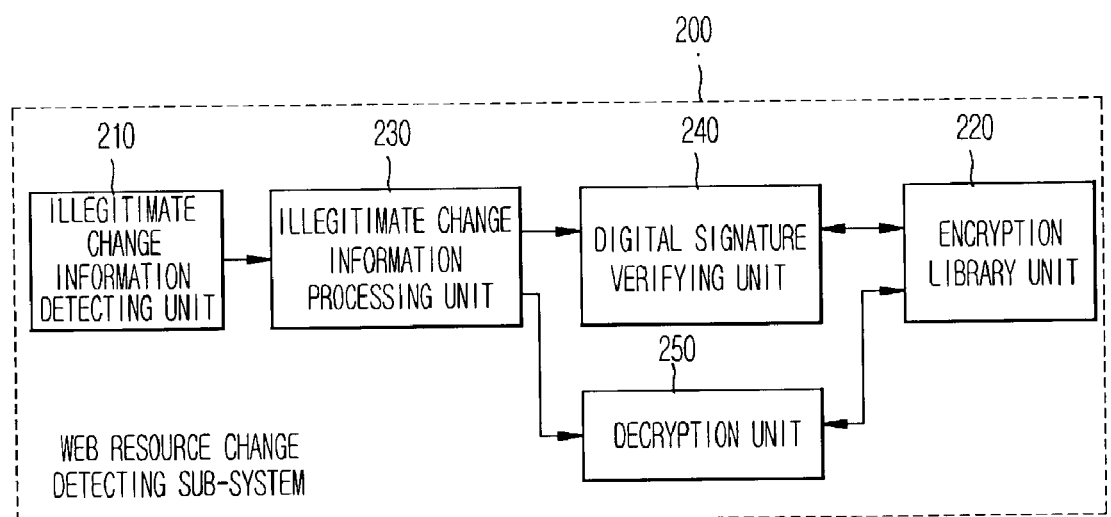
FIG. 3 is a schematic block diagram of a web resource change detecting sub-system in accordance with an embodiment of the present invention.

FIG. 3 is a schematic block diagram of the web resource change detecting sub-system 200 in accordance with an embodiment of the present invention. Referring to FIG. 3, the web resource change detecting sub-system 200 includes an illegitimate change information detecting unit 210, an encryption library unit 220, an illegitimate change information processing unit 230, a digital signature verifying unit 240, and a decryption unit 250.

In case where the user accesses a predetermined document via a communication network and executes a link to the web resource illegitimate change detecting information of the document, the illegitimate change information detecting unit 210 checks whether or not there is actually the illegitimate change detecting information of the document. Then, the illegitimate change information detecting unit 210 calls other processing unit to operate a function of detecting the illegitimate change, thereby detecting whether or not the corresponding document is illegitimately changed. In other words, the illegitimate change information detecting unit 210 is called 'web contents protection field detecting plug-in', and is contained in a user client system. Therefore, the illegitimate change information detecting unit 210 operates the function of detecting the illegitimate change in a plug-in type by a user's selection. At this time, the user can confirm whether or not there occurs the illegitimate change by clicking the link to the illegitimate change detecting information only when necessary, thereby obtaining an effective processing. Meanwhile, the illegitimate change information detecting unit 210 needs predetermined operation conditions. First, the link to the illegitimate change detecting information should be included within the web page accessed by the user. Second, the user should access the XML-type illegitimate change detecting information of the web page by clicking the link.

The encryption library unit 220 has various encryption algorithms stored therein and provides corresponding encryption algorithm in response to an external request.

In case where the illegitimate change information detecting unit 210 detects the illegitimate change detecting information of the corresponding document, the digital signature verifying unit 240 verifies the document based on a predetermined encryption algorithm stored in the encryption library unit 220. In other words, the digital signature verifying unit 240 verifies the XML digital signature of the web page and related web resources to which the illegitimate change detecting process is performed. Through the verification, it can be judged whether or not the corresponding web page and the related web resources are changed.

The illegitimate change information processing unit 230 judges the truth of the corresponding document using the processing result of the digital signature verifying unit 240, and provides the judgment result to the user. At this time, the illegitimate change information processing unit 230 is called by the illegitimate change information detecting unit 210 and calls the digital signature verifying unit 240 to verify the web contents protecting information constituted with the XML digital signature. Meanwhile, in case where there are the additionally encrypted resources, the illegitimate change information processing unit 230 calls the decryption unit 250 to decrypt the additionally encrypted resources. Then, the illegitimate change information processing unit 230 displays the decryption result to the user.

Meanwhile, in case where there is the encrypted resource and the user has a decryption key for decrypting it, the decryption unit 250 performs an XML decryption of the encrypted resource based on a predetermined encryption algorithm stored in the encryption library unit 220 and the key. Then, the processing result is provided to the user through the illegitimate change information processing unit 230. At this time, if the decryption unit 250 succeeds in the decryption, URI information of the encrypted resources in the web page (e.g., index.html) is updated with that of the file generated from the decryption result. If the decryption unit 250 fails in the decryption for reasons, e.g., that there is no decryption key, the user watches the web page, in which the illegitimate change is detected and a specific portion is encrypted, through the web browser.

Figure 4:
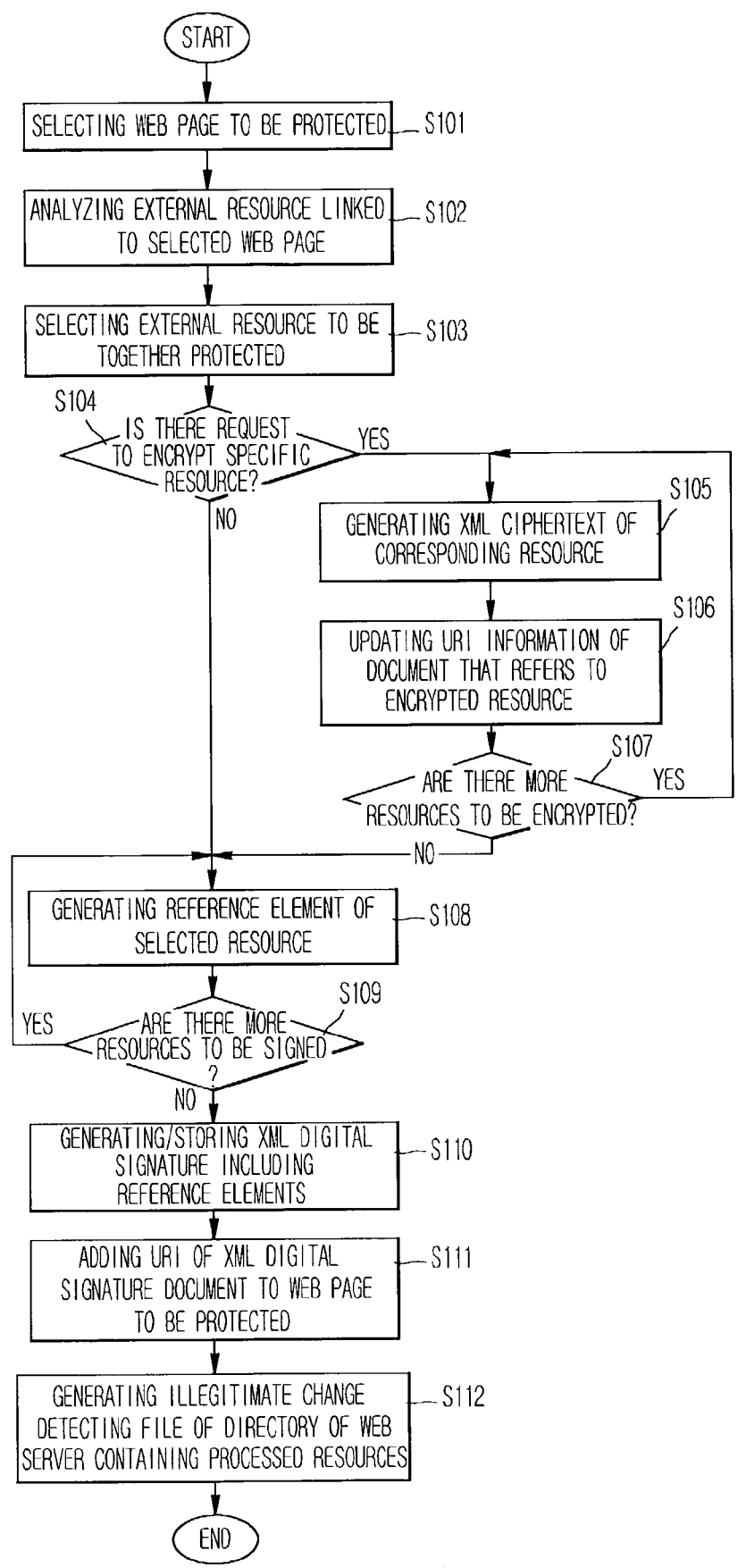
FIG. 4 is a flow chart showing a method of generating a web resource change detecting information in accordance with an embodiment of the present invention.

FIG. 4 is a flow chart showing a method of generating the web resource change detecting information in accordance with an embodiment of the present invention. At this time, the method of generating the web resource change detecting information is performed in the web resource protection processing sub-system 100 by a web sever administrator. Referring to FIG. 4, first, a web page (e.g., index.html) selected by the user and related resources are inputted (S101) so as to process the illegitimate change detecting information.

An example of the selected web page (index.html) is as follows:

```
<HTML>
<HEAD>
<TITLE> Jae Seung Lee </TITLE>
</HEAD>
<body background="pastel.gif" text="#000000" link="#0000ff" vlink="#8c1717">
<IMG SRC="leejs.jpg"><P>
<H2> <IMG SRC="zigzag.gif"> <a href="private.html">Personal Information</a></H2>
<H2> <IMG SRC="zigzag.gif"> <a href="pay.xml">Payment Information</a></H2>
<H2> <IMG SRC="zigzag.gif"> <a href="doc/12-style.xml">Report</a></H2>
<H2> <IMG SRC="zigzag.gif"> <a href="price.html">Information on Today's Food Price</a> </H2>
<P> <HR size=5>
<ADDRESS>
<H2> <A HREF="http://www.etri.re.kr/"> <IMG ALIGN=MIDDLE SRC="home.gif">
</A> ETRI Home page </H2>
<H2> <A HREF="mailto:jasonlee@etri.re.kr"><IMG ALIGN=MIDDLE SRC=
"mail.gif"></A> e-mail:jasonlee@etri.re.kr</H2>
Copyright 2001, Lee, Jae Seung, All Rights Reserved.
</ADDRESS>
</BODY>
</HTML>
```

Then, external resources linked to the selected web page are analyzed (S102). After displaying the analysis result to the user, among the external resources, the resources to which the illegitimate change detecting process is to be performed and the resources to which the encryption process is to be performed are selected by a user's selection (S103).

In the above example, assume that the web page (index.html) itself and the files including private.html, pay.xml, doc/12-style.xml, price.html as the resources linked to the web page are selected.

In case where the resources to which the illegitimate change detecting process is performed are selected (S103), it is checked whether or not there is a request to encrypt a specific resource (S104). In case of the above example, since the contents of <CreditCard> element in pay.xml is selected to be encrypted so that only the specific operator can see them, an XML ciphertext of the corresponding resource is generated (S105) and URI information of the web page (index.html) that refers to the encrypted resource is updated (S106). In other words, URI reference information of the

```
        1. The contents of private.html are as follows:
<HTML>
<HEAD>
<TITLE>Personal Information</TITLE>
</HEAD>
<BODY>
<UL>
    <LI> Name: Jae Seung Lee
    <L1> e-mail: <a href="mailto: jasonlee@etri.re.kr"> jasonlee@etri.re.kr</a>
    <L1> Office: Electronics and Telecommunications Research Institute (ETRI)
    <L1> Information Security Research Division EC Information Security Research
Team
</UL>
</BODY>
</HTML>
        2. The contents of pay.xml are as follows:
<?xml version="1.0"?>
<PaymentInfo xmlns="http://example.org/paymentv2">
    <Name> Jae Seung Lee <Name/>
    <CreditCard Limit="5,000" Currency="USD">
        <Number> 4019 2445 0277 5567 </Number>
        <Issuer> Bank of the Internet </Issuer>
        <Expiration> 04/02 </Expiration>
    </CreditCard>
</PaymentInfo>
        3. The contents of doc/12-style.xml is omitted since they are too long
        4. The contents of price.html are as follows:
<HTML>
<HEAD>
<TITLE> Information about Today's Food Price </TITLE>
</HEAD>
<BODY>
<CAPTION> Menu List </CAPTION>
<TABLE BORDER=5 CELLSPACING=5 WIDTH="30%" HEIGHT="10%">
<TR>
<TD ALIGN=LEFT> Classification </TD> <TD ALIGN=LEFT> Name</TD>
<TD ALIGN=LEFT> PRICE </TD>
</TR>
<TR>
<TD> Tea </TD> <TD> Coffee </TD> <TD> 3,500 </TD>
</TR>
<TR>
<TD> Tea </TD> <TD> Chinese Lemon Tea </TD> <TD> 3,500 </TD>
</TR>
<TR>
<TD> Beverage </TD> <TD> Cola </TD> <TD> 4,000 </TD>
</TR>
<TR>
<TD> Alcoholic Liquors </TD> <TD> Beer </TD> <TD> 2,500 </TD>
</TR>
<TR>
<TD> Western Food </TD> <TD> Pork </TD> <TD> 5,000 </TD>
</TR>
<TR>
<TD> Korean-style Food </TD> <TD> Kimchi Fried Rice </TD> <TD> 5,000 </TD>
</TR>
</TABLE BORDER>
</BODY>
</HTML>
```

Meanwhile, it is assumed that the contents of <CreditCard> element in pay.xml is selected to be encrypted so that only a specific operator can see them, and the encrypted file name is saved as encrypted-pay.xml.

web page is updated with that (encrypted-pay.xml) of the encrypted document. Then, it is checked whether or not there are more resources to be encrypted. The steps S105 and S106 are repeatedly performed until the resources to be encrypted are not founded (S107). At this time, the ciphertext generating unit 130 shown in FIG. 2 performs the above processes. The result of the XML encrypted file encrypted-pay.xml is as follows:

```
<?xml version="1.0"?>
<PaymentInfo xmlns="http://example.org/paymentv2">
    <Name> Jae Seung Lee <Name/>
    <CreditCard Limit="5,000" Currency="USD">
        <EncryptedData xmlns="http://www.w3.org/2001/04/xmlenc#"
        Type="http://www.w3.org/2001/04/xmlenc#Content">
            <CipherData>
                <CipherValue>A23B45C56</CipherValue>
            </CipherData>
        </EncryptedData>
    </CreditCard>
</PaymentInfo>
```

Then, if the resources to be encrypted are not founded any more or are not selected, the illegitimate change detecting process is performed. At this time, with respect to all the resources selected for the illegitimate change detecting process, each reference element of the corresponding resources is generated (S108, S109). Then, the XML digital signature containing the reference element is generated and stored.

In other words, the detached-mode XML digital signature of the selected resources is generated. In the above example, the illegitimate change detecting process is performed to several web resources (private.html, encrypted-pay.xml, doc/12-style.xml, price.html), which is processed in a type of one XML digital signature document. Message digest information of each resource is contained in the reference element, and a digital signature value and certificate information are contained in the XML digital signature document.

The XML digital signature document finally generated in the above example is as follows, and, in this example, it is assumed that the XML digital signature document is saved as verifythis.xml of an XML document.

```
<?xml version="1.0"?>
<!DOCTYPE Signature SYSTEM "xmldsig.dtd">
<Signature xmlns="http://www.w3.org/2000/09/xmldsig#">
    <SignedInfo>
        <CanonicalizationMethod Algorithm="http://www.w3.org/TR/2000/
            CR-xml-cl4n-20001026#WithComments"/>
        <SignatureMethod Algorithm=
            "http://www.w3.org/2000/09/xmldsig#kcdsa-sha1"/>
        <Reference URI="http://b2b.etri.re.kr/~jasonlee/doc/12-style.xml">
            <Transforms>
                <Transform Algorithm="http://www.w3.org/TR/2000/
                    CR-xml-c14n-20001026#WithComments"/>
            </Transforms>
            <DigestMethod Algorithm="http://www.w3.org/2000/09/xmldsig#sha1"/>
            <DigestValue>OxjPx6p2eKv3UzkI6bssw6ta2c=</DigestValue>
        </Reference>
        <Reference Type=http://www.w3.org/2000/09/xmldsig#Manifest
        URI="#manifest1">
            <DigestMethod Algorithm="http://www.w3.org/2000/09/xmldsig#sha1"/>
            <DigestValue>DO2HCComq89PtKSjrd8lidI35Xg=</DigestValue>
        </Reference>
        <Reference Type=http://www.w3.org/2000/09/xmldsig#Manifest
        URI="#manifest2">
            <DigestMethod Algorithm="http://www.w3.org/2000/09/xmldsig#sha1"/>
            <DigestValue>SQOe8jgFY4hX41OL+0fGAexx7S4=</DigestValue>
        </Reference>
    </SignedInfo>
    <SignatureValue>MCwCFC3DWv2JhlwibW7rxzR3FbpwrTtxAhQS
        PWNmiV0gmfBM19liudbZCyIhbg==</SignatureValue>
    <KeyInfo>
        <X509Data>
        <X509SubjectName>CN=ETRI CA, OU=ETRI, O=ETRI,
            C=KR</X509SubjectName>
        <X509Certificate>
            MIIDIzCCAuCgAwIBAgIGAO172p11Mqz4CFBM1WSeWMGsT2tc6uX
            WiPX8vYuc/
        </X509Certificate>
        </X509Data>
    </KeyInfo>
    <Object>
        <Manifest Id="manifest1">
            <Reference URI="http://b2b.etri.re.kr/~jasonlee/private.html">
                <DigestMethod Algorithm="http://www.w3.org/2000/09/xmldsig#md5"/>
                <DigestValue>Lcg0z27TERK4VsyyldwEbq==</DigestValue>
            </Reference>
            <Reference URI="http://b2b.etri.re.kr/~jasonlee/price.html">
                <DigestMethod Algorithm="http://www.w3.org/2000/09/xmldsig#sha1"/>
                <DigestValue>ByfFrY/EaunmViIl/ziKcFflRLQ=</DigestValue>
            </Reference>
        </Manifest>
    </Object>
```

```
<Object>
    <Manifest Id="manifest2">
        <Reference URI="http://b2b.etri.re.kr/~jasonlee/index.html"/>
        <DigestMethod Algorithm="http://www.w3.org/2000/09/xmldsig#sha1"/>
        <DigestValue>an3ElahnhL1fBFcbuWsEyvp+7Qk=</DigestValue>
        </Reference>
        <Reference URI="http://b2b.etri.re.kr/~jasonlee/encrypted-pay.xml">
            <Transforms>
                <Transform Algorithm="http://www.w3.org/TR/2000/
                   CR-xml-c14n-20001026#WithComments"/>
            </Transforms>
            <DigestMethod Algorithm=="http://www.w3.org/2000/09/xmldsig#sha1"/>
            <DigestValue>an3ElahnhL1fBFcbuWsEyvp+7Qk=</DigestValue>
        </Reference>
    </Manifest>
</Object>
</Signature>
```

If the XML digital signature document is generated, a link to the XML digital signature document is generated at the web page to be protected. If the link is selected by a user, the corresponding documents and resources are verified by accessing the XML digital signature (S111). In other words, in the above example, after generating the URI information (e.g., <a href="verifythis.xml">page verification</a>) of the XML digital signature document at the web page (index.html), if this link is clicked at the web browser, the XML digital signature is accessed and used to verify the resources.

Finally, the checksum file of the directory of the web server, including the illegitimate change detecting information, the selected web page and the linked resources, is generated (S112). In other words, after the illegitimate change detecting process and the encryption process, the checksum file of the corresponding directory of the web server is generated so as to detect attacks such as a damage of the illegitimate change detecting information (e.g., verifythis.xml) caused by a hacking of the web server and a removal of the link (e.g., <a href="verifythis.xml">page verification</a>) to the illegitimate change detecting information of the web page (e.g., index.html). Therefore, the web server administrator periodically compares the contents of the checksum file with those of the present file to check whether or not the file is changed.

Figure 5:
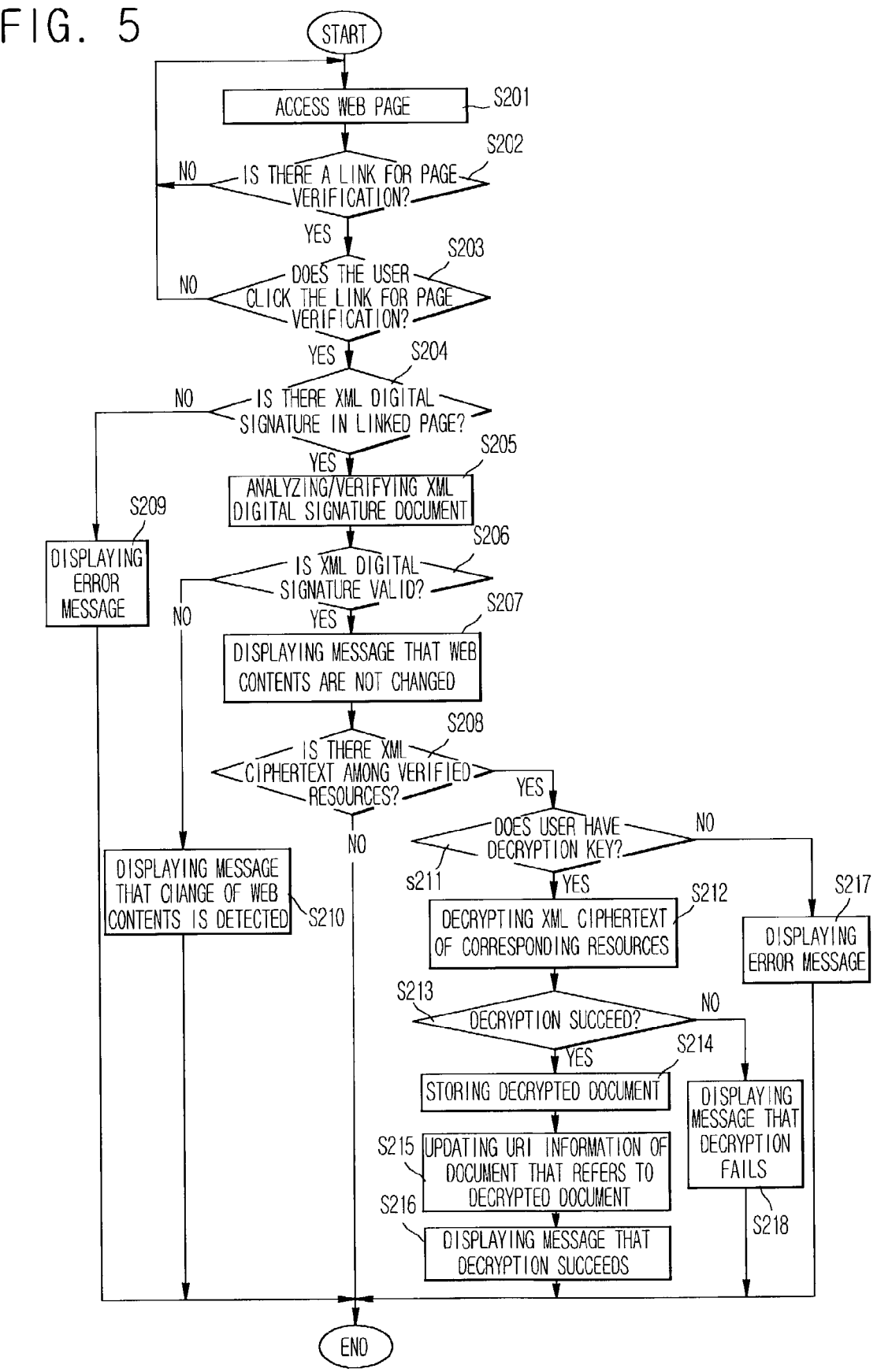
FIG. 5 is a flow chart showing a method of detecting whether or not web resources are changed in accordance with an embodiment of the present invention.

FIG. 5 is a flow chart showing a method of detecting whether or not the web resources are changed in accordance with an embodiment of the present invention.

Referring to FIG. 5, first, the user accesses the web page via the communication network (S201). If the link to the illegitimate change detecting information contained in the web page is selected, it is checked whether or not there is the illegitimate change detecting information constituted with the XML digital signature of the corresponding web page (S202, S203, S204). In other words, when the web server administrator or the ordinary user accesses the web page through the web browser, if there is the link (e.g., <a href="verifythis.xml">page verification</a>) to the illegitimate change detecting information at the corresponding web page (index.html), the user accesses the linked page by clicking the page verification link and checks whether or not there is the illegitimate change detecting information constituted with the XML digital signature.

As a result of the step S204, if there is the illegitimate change detecting information, the illegitimate change detecting information is analyzed to verify the validity of the XML digital signature (S205), and the verification result is then provided to the user (S206, S207, S210). In other words, after verifying the XML digital signature of the illegitimate change detecting information constituted with the XML digital signature, it can be judged whether or not the corresponding web page (index.html) and the related web resources are changed. At this time, the related web resources include the personal information (private.html), the encrypted payment information (encrypted-pay.xml), the report (doc/12-style.xml) and the information on today's food price (price.html). As the checking result, if the verification of the XML digital signature fails, the result that the illegitimate change occurs is displayed to the user.

Meanwhile, it is checked whether or not there is the XML ciphertext among the verified resources (S208). If there is the XML ciphertext, it is checked whether or not the user has the decryption key for decrypting the corresponding ciphertext (S211). As a result, if the user has the decryption key, the corresponding XML ciphertext is decrypted using the decryption key (S212). If the decryption succeeds, the decrypted document is stored (S213, S214). Then, the URI information of the prior-to-decryption XML ciphertext is updated with that of the decrypted document (S215) and a message that the decryption succeeds is displayed (S216).

In the above example, if the decryption succeeds, the URI information (encrypted-pay.html) of the encrypted resources at the corresponding web page (index.html) is updated with that (pay.xml) of the file generated by the decryption. If the decryption fails for reasons, e.g., that there is no decryption key, the user watches the web page, in which the illegitimate change is detected and a specific portion is encrypted through the web browser.

Meanwhile, among the above processes, if there is no XML digital signature at the linked page (S204) or if there is no decryption key (S211), an error message is displayed (S209, S217). Further, if the XML digital signature exists but it is not valid, a message that the change of the web contents is detected is displayed (S210). As a result of decrypting the ciphertext using the decryption key, if the decryption fails, a message representing that state is displayed.

The apparatus and method for detecting the illegitimate change of the web resources in accordance with the present invention generates the digital signature of various resources in a type of one XML digital signature document by using the XML digital signature technology, in which the various resources include HTML, XHTML and XML documents, general text documents, binary data of graphic files linked to HTML document, thereby preventing the digital signature document from being subordinately processed by a predetermined management program, and being capable of effectively processing the digital signature. Further, it is characteristic of the present invention to confirm the illegitimate change of the web page in real time when inquiring the corresponding web page.

Further, the XML encryption is applied to the specific resources to generate the ciphertext in a type of the XML document so that only a specific person who has the decryption key can inquire the resource, thereby additionally providing the confidentiality.

Furthermore, since the XML digital signature or the XML encrypted result is generated in a type of the XML document, the illegitimate change detecting information is formed in a type of the XML document, and a transmission through the web is possible and there is no need to greatly modify the existing web resources when inserting an additional information for the illegitimate change detecting process.

Meanwhile, the user can confirm the illegitimate change of the web page by clicking the link to the illegitimate change detecting information only when necessary, thereby obtaining an effective processing. In case where the present invention is applied to the electronic commerce services and the on-line stock services, problems such as the manipulation of the goods price and the stock price caused by the hacking of the web server can be prevented.

Although the preferred embodiments of the present invention have been disclosed for illustrative purposes, those skilled in the art will appreciate that various modifications, additions and substitutions can be made without departing from the scope and spirit of the invention as defined in the accompanying claims.

What is claimed is:

1. An apparatus for detecting illegitimate change of web resources comprising:
   a web resource protection processing sub-system for generating and inserting illegitimate change detecting information into a selected web resource, the illegitimate change detecting information being used to detect whether or not the web resource is changed illegitimately, wherein the web resource processing sub-system comprises:
   a user interface unit for selecting a target and external web resources linked thereto, to which the illegitimate change detecting process is to be performed,
   an encryption library unit having various encryption algorithms stored therein, for providing corresponding encryption algorithm in response to an external request,
   a ciphertext generating unit for generating a ciphertext of—each external web resource linked to the target which has been selected to be encrypted by the user interface, based on a predetermined encryption algorithm stored in the encryption library unit, wherein the ciphertext generating unit performs an encryption of an entire document or a portion of the document based upon a user's selection, the encryption being performed after the target and all of the external web resources have been selected by the user interface unit,
   a digital signature generating unit for generating a digital signature of a predetermined target and the selected web resources linked thereto, based on a predetermined encryption algorithm stored in the encryption library unit, and
   a web resource analyzing/processing unit for examining the selected target and external web resources linked to the selected target on which the illegitimate change detecting process is to be performed; for providing information on the resources to which the encryption is to be processed to the ciphertext generating unit; and for receiving the processing results from the digital signature generating unit and the ciphertext generating unit and inserting the illegitimate change detecting information into the selected target; and
   an illegitimate change detection file generating unit for detecting damage to the illegitimate change detecting information for the web resources and damage to the link pointing to the illegitimate change detecting information, from the target; and
   a web resource change detecting sub-system for judging whether or not the web resource is illegitimately changed, based on the illegitimate change detecting information contained in the web resource when the web resource is accessed using a communication network.

2. The apparatus of claim 1, wherein the digital signature generating unit generates a digital signature of a plurality of various resources in a type of one XML document and performs a signing of an entire document or a portion of the entire document by the user's selection, if a to-be-signed target is an XML document, the plurality of various resources including XML, HTML, XHTML, text, and binary file.

3. The apparatus of claim 1, wherein the web resource change detecting sub-system includes:
   an illegitimate change information detecting unit for examining whether or not there is actually an illegitimate change detecting information and calling other processing unit to thereby operate a function of detecting an illegitimate change, if a user accesses a predetermined document via a communication network and then a link to a web resource illegitimate change detecting information of the accessed document is executed;
   an encryption library unit having various encryption algorithms stored therein, for providing corresponding encryption algorithm in response to an external request;
   a digital signature verifying unit for performing a verification of the document and linked related resources based on a predetermined encryption algorithm stored in the encryption library unit, if an illegitimate change detecting information of the corresponding document is detected by the illegitimate change information detecting unit; and
   an illegitimate change information processing unit for calling the digital signature verifying unit, examining the truth of corresponding document using a processing result of the digital signature verifying unit, and providing the examination result to the user.

4. The apparatus of claim 3, wherein the web resource change detecting sub-system further comprises a decryption unit for performing an XML decryption of the encrypted resource based on a predetermined encryption algorithm and a decryption key for decrypting the encrypted resource, in case there are an encrypted resource and the decryption key, the predetermined encryption algorithm being stored in the encryption library unit, thereby providing the processing result to the user through the illegitimate change information processing unit.

5. A method for detecting an illegitimate change of web resources, the method comprising the steps of:
   a) generating an illegitimate change detecting information for detecting whether or not the web resources are illegitimately changed and inserting the illegitimate change detecting information into corresponding web resource, wherein generating and inserting an illegitimate change detecting information includes:
   a1) receiving web page selection information in which the illegitimate change detecting process is to be performed and related option information from a user;
   a2) analyzing at least one external resource linked to the received web page;
   a3) selecting the at least one external resource; and
   a4) generating an XML ciphertext of all selected external resources after all of the external web resources have been selected, and
   updating URI information of the web page that refers to the resource; and
   b) when the corresponding web resource is accessed over a communication network, judging whether or not the web resource is illegitimately changed, based on the illegitimate change detecting information contained in the corresponding web resource.

6. The method of claim 5, wherein the step a) further comprises the steps of:
   a4) generating reference elements of each of the selected resources, and generating and storing an XML digital signature containing the reference elements;
   a5) generating a link to the XML digital signature document of the web page selected at step a1) to make the XML digital signature accessible if the link is selected to perform a verification of the corresponding document by the user; and
   a6) generating a checksum file of a directory of web server so as to detect a damage of the illegitimate change detecting information and that of the information on the link to the illegitimate change detecting information of the corresponding web page, the web server including the illegitimate change detecting information and the linked resources.

7. The method of claim 6, wherein the step b) comprises the steps of:
   b1) if the user accesses the web page via a communication network and then selects a link to the illegitimate change detecting information contained in the web page, checking whether or not there is the illegitimate change detecting information constituted with the XML digital signature at the corresponding web page;
   b2) if there is the illegitimate change detecting information as a result of the step b1), analyzing the illegitimate change detecting information and verifying whether or not the XML digital signature is valid; and
   b3) providing the verification result of the step b2) to the user.

8. The method of claim 7, wherein the step b) further comprises the steps of:
   b4) if the XML digital signature is valid as the verification result of the step b2), examining whether or not there is an XML ciphertext among the resources, and, if there is the XML ciphertext, checking whether or not the user has a decryption key for decrypting the corresponding ciphertext;
   b5) if the user has the decryption key as a checking result of the step b4), decrypting the corresponding XML ciphertext using the key;
   b6) if the process of decrypting the corresponding XML ciphertext succeeds, storing the decrypted document, and updating URI information of the prior-to-decryption XML ciphertext with that of the decrypted document; and
   b7) displaying to the user a message representing the success in the decryption.

9. A computer-readable recording medium containing a plurality of computer-executable instructions for performing the method recited in claim 5.

* * * * *